Nov. 4, 1930.  A. S. JOHNSON  1,780,392
DRY POULTRY FEEDER
Filed Dec. 4, 1929  2 Sheets-Sheet 1

INVENTOR.
ANDREW S. JOHNSON,
BY
ATTORNEY.

Nov. 4, 1930.                A. S. JOHNSON                    1,780,392
                             DRY POULTRY FEEDER
                    Filed Dec. 4, 1929          2 Sheets-Sheet 2

INVENTOR.
ANDREW S. JOHNSON,
BY
ATTORNEY.

Patented Nov. 4, 1930

1,780,392

UNITED STATES PATENT OFFICE

ANDREW S. JOHNSON, OF ST. PAUL, MINNESOTA

DRY POULTRY FEEDER

Application filed December 4, 1929. Serial No. 411,526.

This invention relates generally to automatically operable poultry feeding devices and more particularly to a device of this general nature in which the feed distributing operations are time controlled.

A general object of the invention is to provide a device for automatically delivering feed or other material to poultry or other animals at a time selected in advance by the attendant and at which the device is set to operate.

Another object of the invention is to provide for a relatively wide distribution or scatter of the grain or other feed in the feed discharging operation.

With these and other objects in view the invention includes a holding receptacle or hopper arranged to be suspended in a relatively elevated position and provided with a gate or closure for its lower end which is normally latched in a closed position. A latch releasing device is provided which takes the form of a clock or timing mechanism which can be set to release the gate and discharge the hopper at any predetermined time.

Another feature of the invention consists of a feed distributing device which preferably includes a plurality of conical deflecting members mounted in a nested but spaced apart relation and with openings at their apexes to receive a stream of grain or the like pouring from the hopper. The conical deflecting members act to provide a substantial scattering or distributing effect of the material engaging their outer surfaces so that the grain fed from the hopper is scattered over the entire range of the feeding floor.

Other features of the invention will be hereinafter referred to.

In the drawings, in which a preferred embodiment of the invention has been selected for illustration:

Figures 1, 2:
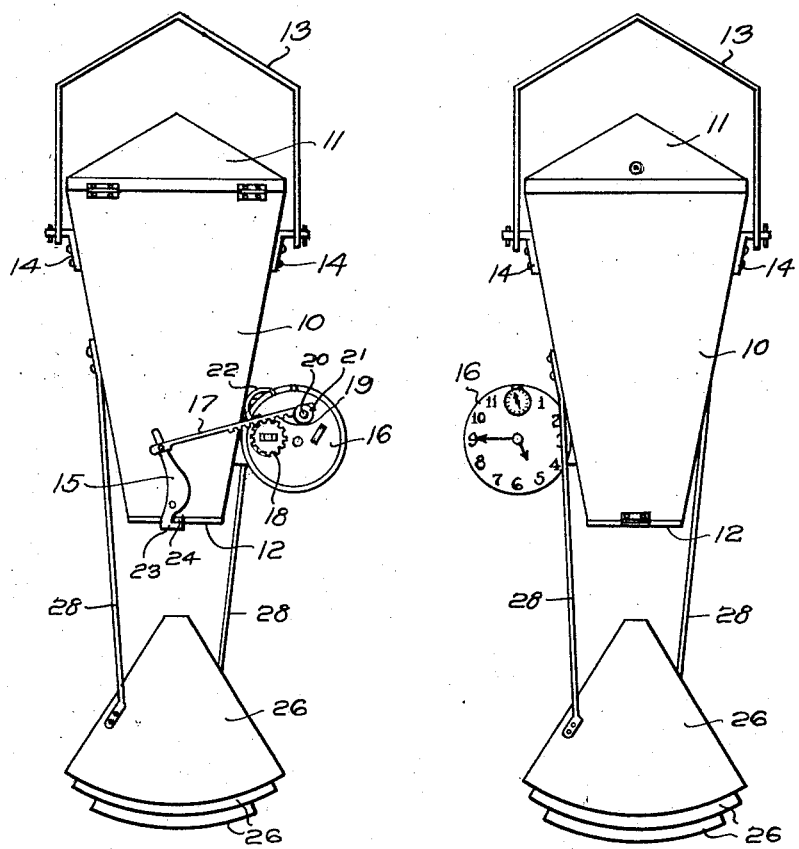
Figure 1 is a view in side elevation of a poultry feeding device embodying the invention.
Figure 2 is a view similar to Figure 1 showing the opposite side of the device.
Figure 3:
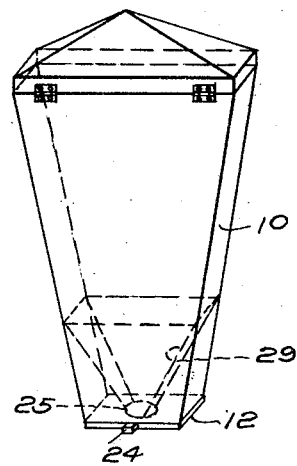
Figure 3 is a view in perspective showing the construction of a feed hopper forming part of the invention.
Figure 4:
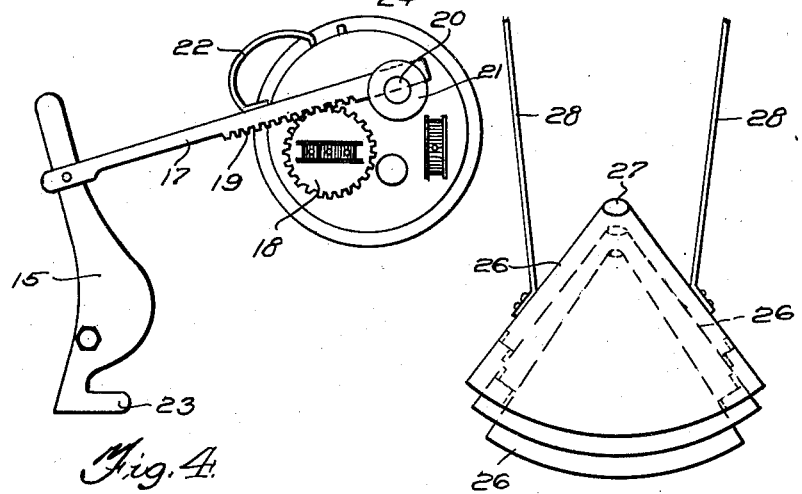
Figure 4 is a view in elevation and on an enlarged scale of a clock-acutated gate-releasing device forming part of the invention.
Figure 5:
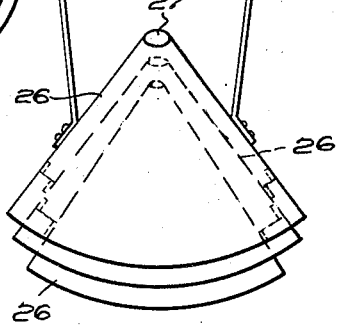
Figure 5 is a view in side elevation and on an enlarged scale of a material scattering or distributing device forming part of the invention.

Referring to the drawings for a more detailed description of the invention, a poultry feeding device is shown which includes a food holding hopper or receptacle 10 provided with a hinged cover member 11 at its upper end, and with a hinged gate or closure member 12 at its lower end. The hopper is equipped with a bail member 13 engaging ears 14 on a side of the hopper and adapted to be supported by a hook or other supporting member at a considerable elevation from the floor or feeding platform.

The gate or closure member 12 for the lower end of the hopper is normally held in closed position by means of a hinged latch member 15. In order to swing the latch member to gate releasing position, a clock or other timing mechanism 16 is provided which has a link connection 17 with the latch 15 and operates through this connection to release the closure member 12 at any predetermined time selected by the attendant in charge of the device.

The clock 16 may take an ordinary and usual form equipped with an alarm actuating mechanism to the shaft of which a toothed gear or pinion 18 is attached which is arranged to latch with link teeth 19 forming a link member 17 already referred to. In order to hold the rack bar 17 in position the alarm setting shaft 20 is provided at its outer end with a flange 21 which serves to hold the rack bar 17 in position against the rear face of the clock. In order to hold the rack teeth 19 of the bar 17 in engagement with the teeth of the pinion 18 a spring member 22 is provided which is arranged to press downwardly against the bar 17 and produces the desired effect. It will be seen that with this construction that at the predetermined hour set the alarm actuating mechanism will operate and will pull upon the tooth bar 17 to thereby swing the latch member 15 about its pivot and release the hook portion 23 of the latch from its engagement with a projecting lug or detent 24 formed on the closure member 12. It will be seen that when this takes place the grain or other material contained within the hopper 10 will pour through the discharge opening 25 provided for the purpose.

In order to scatter or widely distribute the grain or other material pouring through the discharge opening 25 in the lower end of the hopper 10, a plurality of conical deflecting members 26 are provided which are nested within each other in a spaced apart relation such that grain entering openings 27 in the apexes of the conical members engages the outer flaring walls of the members and is thereby distributed over a substantial or considerable area of the feeding floor. It will be seen that the openings 27 of the conical members 26 have a progressively reducing feed release from the uppermost opening to the lowermost one so that a portion of the grain entering through any given opening falls outside the opening next beneath and thereby engages the flaring wall of the deflector to be distributed thereby.

The grain distributing device thus provided is supported by the hopper above by means of a bar, rods or like members 28. It will also be seen that the lowermost end of the opening of the hopper 10 is provided with a funnel shaped member 29 which terminates at the discharge opening 25 already referred to, the opening 25 being located directly above the uppermost opening 27 of the grain distributing or scattering device 26.

In practice, the device as a whole is supported at a considerable elevation above the feeding floor and the timing clock 16, from which the alarm mechanism has been removed, is set to distribute the feed at a desired time which may conveniently be arranged for an early morning feeding, to be brought about before the attendant has visited the premises. It will be clear that the device may be used for releasing feed at any other or selected time, and may be used for successive feedings throughout a given period of time, a new setting being made for each successive feeding as will be clear.

What is claimed is:—

1. A poultry feeder, comprising a hopper provided in its bottom with an outlet opening, means to cover and uncover the outlet opening, a plurality of conical deflectors supported beneath the outlet opening of the hopper and having openings at their apexes which are in substantial alinement with the outlet of the hopper, said conical deflectors being arranged in spaced superposed substantially concentric relation, the lower end of the lower conical deflector being of smaller diameter than the lower end of the next upper conical deflector, whereby the lower conical deflector will distribute the feed upon a smaller area than the upper conical deflector.

2. A poultry feeder comprising a hopper provided in its bottom with an outlet opening, at least three conical deflectors arranged beneath the outlet opening and provided at their apexes with openings, said conical deflectors being arranged in spaced superposed substantially concentric relation, the diameters of the lower ends of the conical deflectors decreasing with each successive lower conical deflector whereby the areas over which the deflectors distribute the feed decrease with each successive lower deflector, and means to support the deflectors.

3. A poultry feeder comprising a hopper provided in its bottom with an outlet opening and having a downwardly tapering member within its lower portion having its lower reduced end leading into said outlet opening, a hinged door adapted to cover the outlet opening, a latch to hold the hinged door in the closed position, means to actuate the latch, a plurality of conical deflectors arranged beneath the hopper and provided at their apexes with openings, said conical deflectors being disposed in spaced superposed substantially concentric relation, each successive lower conical deflector having a smaller diameter at its bottom than the next upper conical deflector whereby the bottom of such upper conical deflector projects radially beyond the next lower conical deflector, and means for supporting the conical deflectors.

In testimony whereof I affix my signature.

ANDREW S. JOHNSON.